(12) United States Patent
Mizota et al.

(10) Patent No.: US 10,183,633 B2
(45) Date of Patent: Jan. 22, 2019

(54) VEHICLE-MOUNTED-CAMERA BRACKET

(71) Applicant: Panasonic Intellectual Property Management Co., Ltd., Osaka (JP)

(72) Inventors: Shinichi Mizota, Kanagawa (JP); Yukihiro Ooba, Kanagawa (JP); Ryo Fukasawa, Kanagawa (JP); Jinsheng Wang, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/518,021

(22) PCT Filed: Nov. 5, 2015

(86) PCT No.: PCT/JP2015/005553
§ 371 (c)(1),
(2) Date: Apr. 10, 2017

(87) PCT Pub. No.: WO2016/075910
PCT Pub. Date: May 19, 2016

(65) Prior Publication Data
US 2017/0291556 A1   Oct. 12, 2017

(30) Foreign Application Priority Data
Nov. 14, 2014   (JP) .................... 2014-231600

(51) Int. Cl.
*B60R 1/00*   (2006.01)
*F16B 5/07*   (2006.01)
(Continued)

(52) U.S. Cl.
CPC ................ *B60R 11/04* (2013.01); *B60R 1/00* (2013.01); *B60R 11/02* (2013.01); *B60R 19/483* (2013.01);
(Continued)

(58) Field of Classification Search
CPC ............ B60R 11/04; B60R 2011/0045; B60R 2300/802
See application file for complete search history.

(56) References Cited

U.S. PATENT DOCUMENTS 5,823,599 A * 10/1998 Gray ...................... B60K 37/00
                                                                 296/37.8
6,124,886 A *  9/2000 DeLine ................ B60Q 1/2665
                                                                  348/148

(Continued)

FOREIGN PATENT DOCUMENTS

DE        10210628 C1    10/2003
JP         H07-43467 Y2    10/1995

(Continued)

OTHER PUBLICATIONS

Extended European Search Report issued in European Patent Application No. EP 15859367 dated Oct. 11, 2017.

(Continued)

*Primary Examiner* — Amy R Hsu
(74) *Attorney, Agent, or Firm* — Pearne & Gordon LLP

(57) ABSTRACT

Provided is a vehicle-mounted-camera bracket (10) for attaching a vehicle-mounted camera (20) to a vehicle body (30), wherein the durability of a hook (103) is enhanced and the vehicle-mounted-camera bracket (10) is capable of inserting into an attachment hole (31) of the vehicle body (30) along a narrow insertion trajectory. The present invention has: a bracket main body (100) capable of fastening a vehicle-mounted camera (20); and three or more planar hooks (103) for fixing the vehicle-mounted camera (20) to the vehicle body (30), the hooks (103) being formed in the bracket main body (100); the three or more planar hooks (103) being arranged so as to be suspended on at least two facing inside edges of a substantially rectangular attachment (Continued)

hole (31) provided in the vehicle body (30) when the hooks (103) are attached to the vehicle body (30).

8 Claims, 5 Drawing Sheets

(51) Int. Cl.
    *B60R 11/00*      (2006.01)
    *B60R 11/04*      (2006.01)
    *B60R 11/02*      (2006.01)
    *B60R 19/48*      (2006.01)
    *G01D 11/30*      (2006.01)

(52) U.S. Cl.
    CPC ................ *F16B 5/07* (2013.01); *G01D 11/30* (2013.01); *B60R 2011/0045* (2013.01); *B60R 2300/802* (2013.01)

(56) References Cited

U.S. PATENT DOCUMENTS 9,707,903 B2 * 7/2017 Rawlings ................ B60R 11/04
9,871,971 B2 * 1/2018 Wang ...................... H04N 7/183
2002/0074371 A1 * 6/2002 Adams ...................... B60R 9/06
                                                              224/519
2009/0128687 A1 * 5/2009 Woo ........................ B60R 11/04
                                                              348/373
2015/0015713 A1 * 1/2015 Wang ...................... H04N 7/18
                                                              348/148

FOREIGN PATENT DOCUMENTS

| JP | 2518154 Y2 * | 11/1996 |
| JP | 2532705 Y2 * | 4/1997 |
| JP | 2003-002115 A | 1/2003 |
| JP | 2012-035693 A | 2/2012 |
| JP | 2012-035694 A | 2/2012 |

OTHER PUBLICATIONS

International Search Report of PCT application No. PCT/JP2015/005553 dated Jan. 12, 2016.

* cited by examiner

VEHICLE-MOUNTED-CAMERA BRACKET

TECHNICAL FIELD

The present invention relates to an in-vehicle camera bracket for attaching an in-vehicle camera to a vehicle body or an attaching resin panel.

BACKGROUND ART

In recent years, a camera for rear-view monitoring is increasingly attached to a vehicle for the purpose of confirming the blind spots of the rear side of the vehicle from the driver's seat. The main body of such a camera (a module part including an imaging device) is fixed to the vehicle through an in-vehicle camera bracket attached to the vehicle body.

A method for fixing an in-vehicle camera bracket to a vehicle body is known in which a hook claw (fixation hook) is firstly caught at an end surface of an attaching hole of the vehicle body, and then a deformation claw (U-shaped hook) is inserted to the attaching hole of the vehicle body (see PTL 1). With this configuration, when, in the course of the insertion, the deformation claw (U-shaped hook) is deformed inward of the attaching hole of the vehicle body, and the vehicle body and the in-vehicle camera bracket are brought into contact with each other, the deformation claw (U-shaped hook) is expanded outward and caught by the vehicle body together with the hook claw (fixation hook), whereby the in-vehicle camera bracket is fixed to the vehicle body.

CITATION LIST

Patent Literature

PTL 1
Japanese Patent Application Laid-Open No. 2003-2115

SUMMARY OF INVENTION

Technical Problem

However, in the case of the above-mentioned conventional in-vehicle camera bracket, a load of vibration in various directions including a front-rear direction, a left-right direction, an upper-lower direction of the vehicle and the like is intensively exerted on the deformation portion of the U-shaped hook for long periods of time after the in-vehicle camera bracket is attached to the vehicle body, and consequently the durability of the U-shaped hook is reduced.

In addition, in the case of the above-mentioned conventional in-vehicle camera bracket, insertion to the attaching hole of the vehicle body inevitably entails rotation around the fixation hook, and therefore a large insertion locus is required.

In view of the foregoing, an object of the present invention is to provide an in-vehicle camera bracket which can improve the durability of the hook, and can allow for insertion to the attaching hole of the vehicle body with a small insertion locus.

Solution to Problem

An in-vehicle camera bracket of an embodiment of the present invention is configured for attaching an in-vehicle camera to a vehicle body, and the in-vehicle camera bracket includes: a bracket main body capable of fastening the in-vehicle camera; three or more planar hooks formed in the bracket main body, and configured to fix the in-vehicle camera to the vehicle body. The three or more planar hooks are disposed such that the three or more planar hooks are caught by at least opposite two internal edge sides of a nearly rectangular attaching hole provided in the vehicle body when attached to the vehicle body.

Advantageous Effects of Invention

According to the present invention, since a planar hook is disposed in each direction and the impact or the like in each direction can be dispersed, the durability of the planar hook can be improved. Further, according to the present invention, since the planar hook is employed, it is possible to achieve insertion to the attaching hole of the vehicle body with an insertion locus smaller that of the conventional techniques.

DESCRIPTION OF EMBODIMENT

An in-vehicle camera bracket according to an embodiment of the present invention is described in detail below with reference to the drawings.

Embodiment

Figure 1:
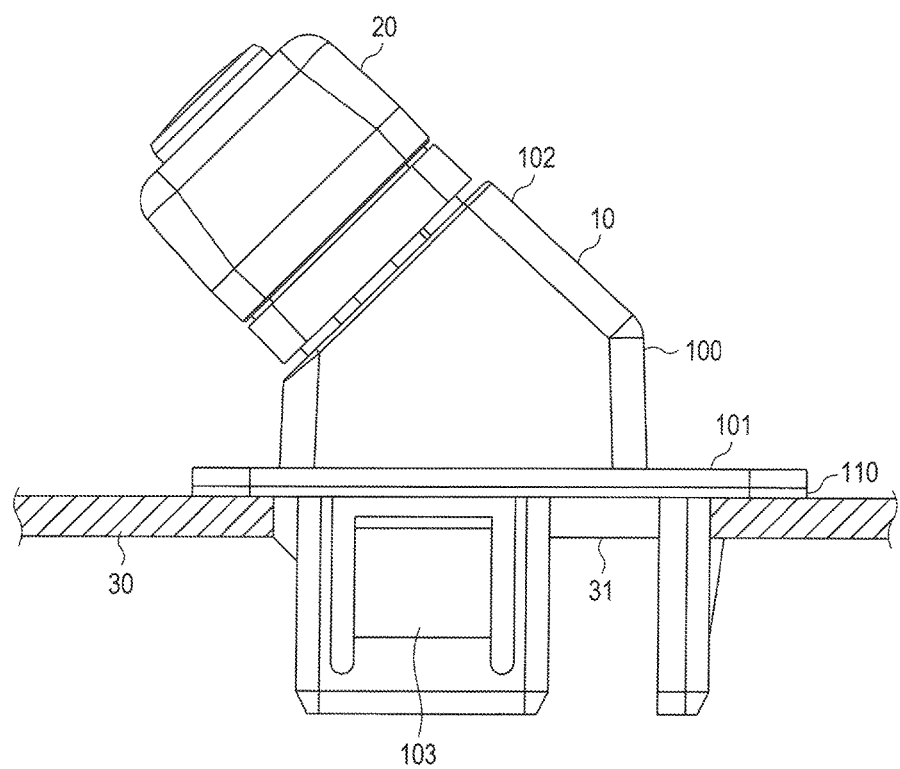
FIG. 1 illustrates a state where an in-vehicle camera bracket according to an embodiment of the present invention is attached to a vehicle body.

FIG. 1 illustrates a state where the in-vehicle camera bracket according to the present embodiment is attached to a vehicle body. It is to be noted that vehicle body 30 is provided with attaching hole 31 having a nearly rectangular shape (with four sides). In-vehicle camera 20 is attached to in-vehicle camera bracket 10. In-vehicle camera bracket 10 is attached to vehicle body 30. As a result, in-vehicle camera 20 is fixed to vehicle body 30 through in-vehicle camera bracket 10.

Figure 2:
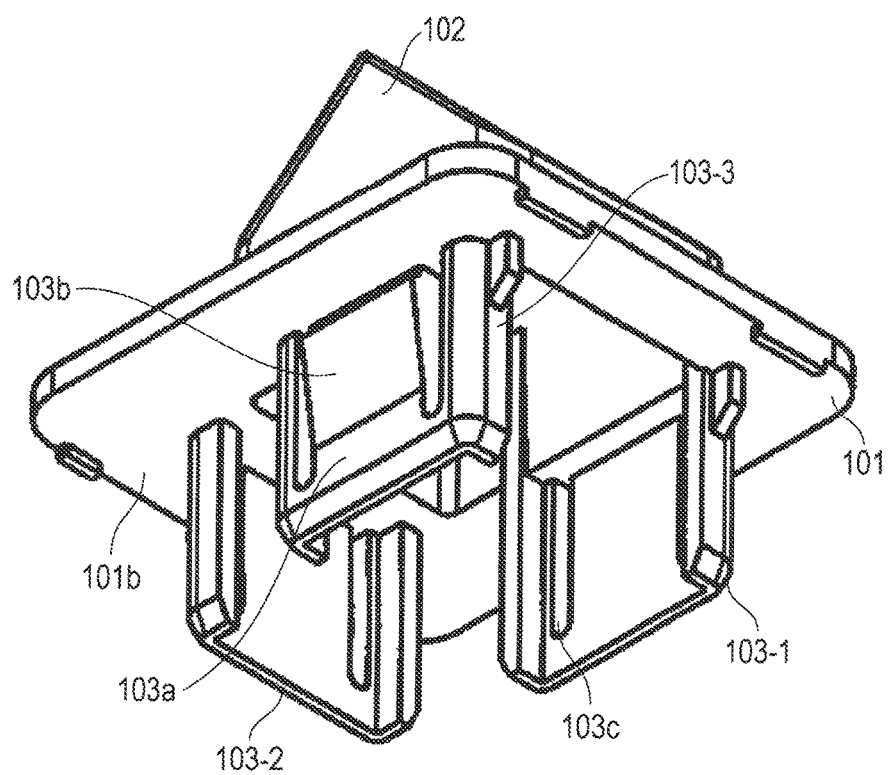
FIG. 2 illustrates a configuration of variation 1 of a bracket main body of the in-vehicle camera bracket according to the embodiment of the present invention (3-point hook)
Figure 3:
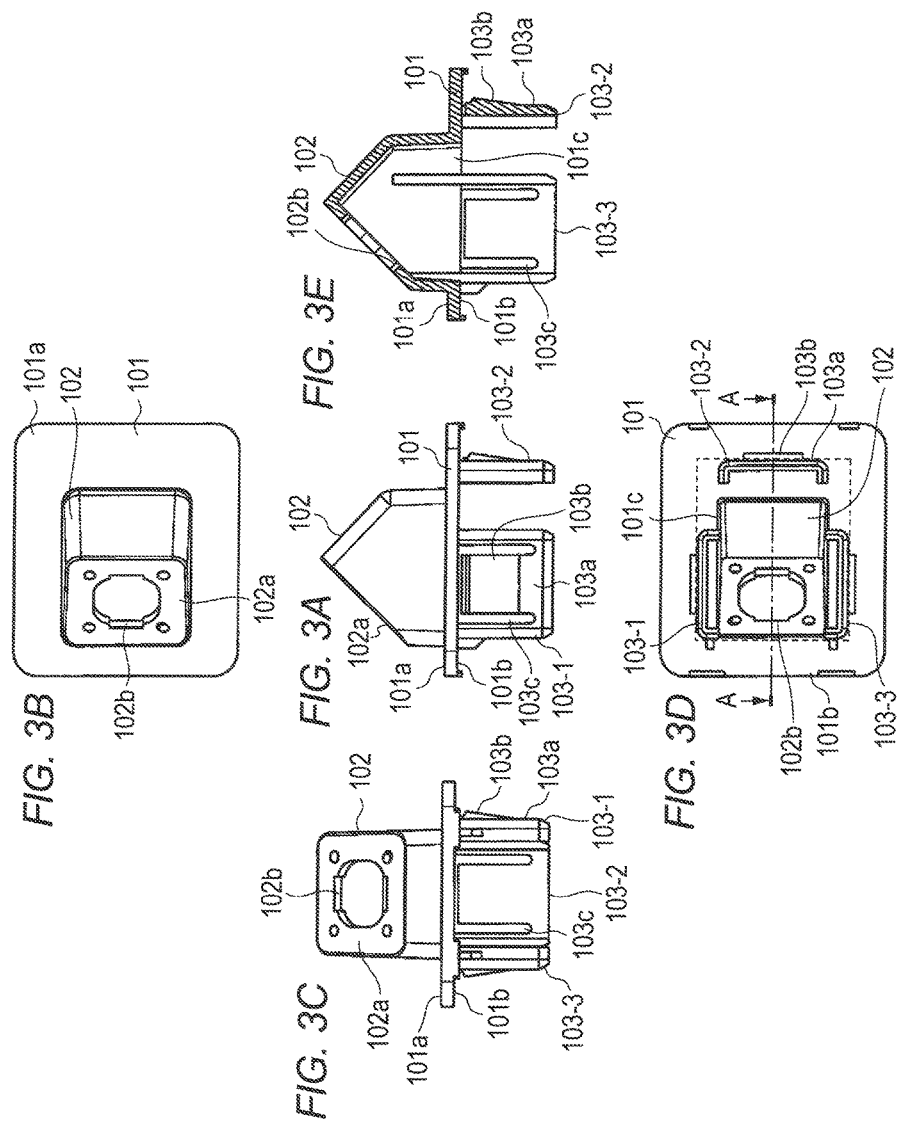
FIGS. 3A, 3B, 3C, 3D and 3E illustrate a configuration of variation 1 of the bracket main body of the in-vehicle camera bracket according to the embodiment of the present invention (3-point hook) (a front view)

FIG. 2 and FIG. 3 illustrate a configuration of a bracket main body of the in-vehicle camera bracket according to the present embodiment. FIG. 2 is a perspective view, FIG. 3A is a front view, FIG. 3B is a plan view, FIG. 3C is a left side view, FIG. 3D is a bottom view, and FIG. 3E is a sectional view taken along line A-A.

Bracket main body 100 is obtained by resin molding, and includes substrate part 101, camera fixing part 102, and three or more planar hooks 103. Substrate part 101 has a nearly-rectangular flat plate shape. Camera fixing part 102 is integrally shaped on upper surface 101a of substrate part 101, and three or more planar hooks 103 (103-1, 103-2, and 103-3) are integrally shaped on bottom surface 101b of substrate part 101. For the purpose of insertion of the cable of in-vehicle camera 20 to the vehicle, hole 101c and hole 102b are formed at a center portion of substrate part 101 and a center portion of attaching surface 102a of camera fixing part 102, respectively. In-vehicle camera 20 is fastened to attaching surface 102a of camera fixing part 102 with a screw or the like.

Three or more planar hooks 103 are disposed such that the hooks are caught by at least opposite two sides of attaching hole 31. Abutting surface 103a of each planar hook 103 is substantially perpendicular to bottom surface 101b. Engaging portion 103b of each planar hook 103 protrudes outward from abutting surface 103a, and the amount of the protrusion increases toward bottom surface 101b. At lateral side portions of engaging portion 103b and a portion between engaging portion 103b and substrate part 101 in the periphery of engaging portion 103b, cutout 103c is formed so that engaging portion 103b can be deflected and deformed. It is to be noted that the width of cutout 103c between engaging portion 103b and substrate part 101 is substantially identical with the thickness of the sheet metal of vehicle body 30.

In addition, for the purpose of preventing entrance of water at a position between vehicle body 30 and substrate part 101 of bracket main body 100, in-vehicle camera bracket 10 includes cushion 110 composed of elastomer which is an elastic body.

When all planar hooks 103 of in-vehicle camera bracket 10 are simultaneously inserted to attaching hole 31, engaging portion 103b of each planar hook 103 is deformed be being deflected inward in the course of the insertion. When vehicle body 30 and cushion 110 of in-vehicle camera bracket 10 make contact with each other, engaging portion 103b of each planar hook 103 is expanded outward, and, in the state where abutting surface 103a of each planar hook 103 is in contact with the internal edge of attaching hole 31 of vehicle body 30, engaging portion 103b of each planar hook 103 is caught at the inner side of the sheet metal of vehicle body 30, whereby in-vehicle camera bracket 10 is fixed to vehicle body 30.

The present invention includes variations differing in the number and the installation position of planar hooks 103. The variations are described below with reference to the drawings.

(Variation 1)

Variation 1 is a case where, as illustrated in FIG. 2 and FIG. 3, bracket main body 100 is provided with three planar hooks 103. When in-vehicle camera bracket 10 is attached to vehicle body 30, planar hooks 103-1, 103-2, and 103-3 are caught by respective internal edge sides of attaching hole 31.

(Variation 2)

Figure 4:
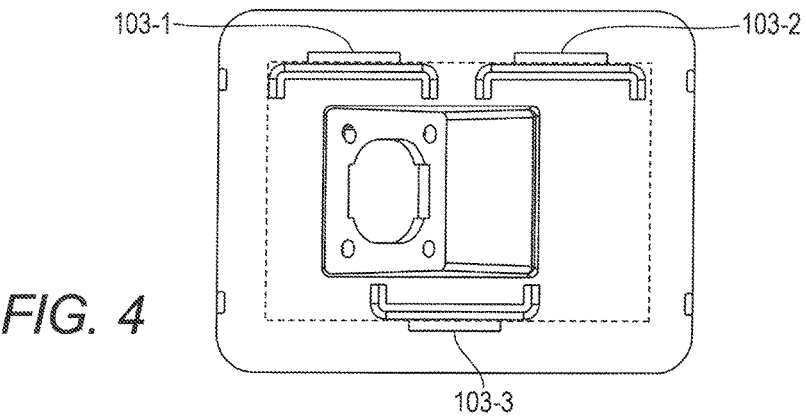
FIG. 4 illustrates a configuration of variation 2 of the bracket main body of the in-vehicle camera bracket according to the embodiment of the present invention (3-point hook)

Variation 2 is a case where, as illustrated in FIG. 4, bracket main body 100 is provided with three planar hooks 103. When in-vehicle camera bracket 10 is attached to vehicle body 30, planar hooks 103-1 and 103-2 are caught by a first internal edge side of attaching hole 31, and planar hook 103-3 is caught by a second internal edge side opposite to the first internal edge side of attaching hole 31.

(Variation 3)

Figure 5:
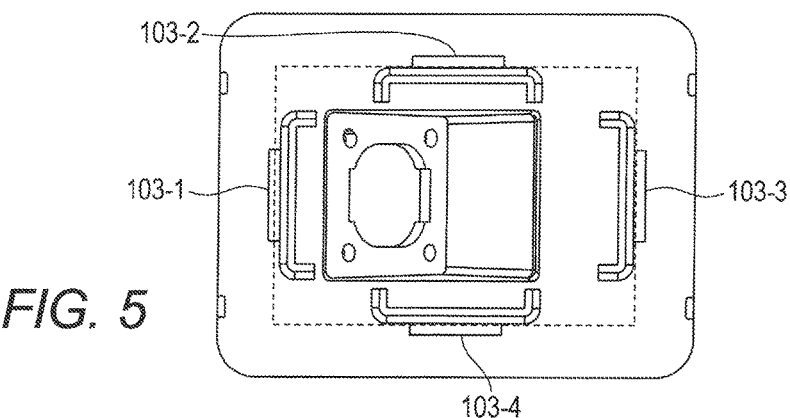
FIG. 5 illustrates a configuration of variation 3 of the bracket main body of the in-vehicle camera bracket according to the embodiment of the present invention (4-point hook)

Variation 3 is a case where, as illustrated in FIG. 5, bracket main body 100 is provided with four planar hooks 103. When in-vehicle camera bracket 10 is attached to vehicle body 30, planar hooks 103-1, 103-2, 103-3, and 103-4 are caught by respective internal edge sides of attaching hole 31.

(Variation 4)

Figure 6:
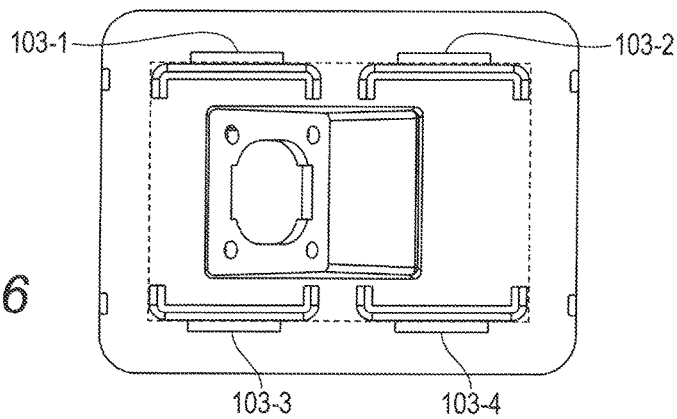
FIG. 6 illustrates a configuration of variation 4 of the bracket main body of the in-vehicle camera bracket according to the embodiment of the present invention (4-point hook)

Variation 4 is a case where, as illustrated in FIG. 6, bracket main body 100 is provided with four planar hooks 103. When in-vehicle camera bracket 10 is attached to vehicle body 30, planar hooks 103-1 and 103-2 are caught by the first internal edge side of attaching hole 31, and planar hooks 103-3 and 103-4 are caught by the second internal edge side opposite to the first internal edge side of attaching hole 31.

(Variation 5)

Figure 7:
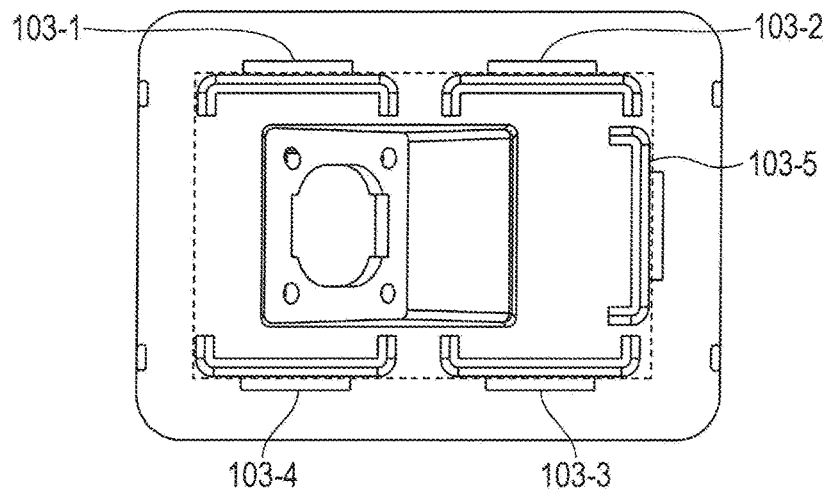
FIG. 7 illustrates a configuration of variation 5 of the bracket main body of the in-vehicle camera bracket according to the embodiment of the present invention (5-point hook)

Variation 5 is a case where, as illustrated in FIG. 7, bracket main body 100 is provided with five planar hooks 103. When in-vehicle camera bracket 10 is attached to vehicle body 30, planar hooks 103-1 and 103-2 are caught by the first internal edge side of attaching hole 31, planar hooks 103-3 and 103-4 are caught by the second internal edge side opposite to the first internal edge side of attaching hole 31, and planar hook 103-5 is caught by a third internal edge side of attaching hole 31.

(Variation 6)

Figure 8:
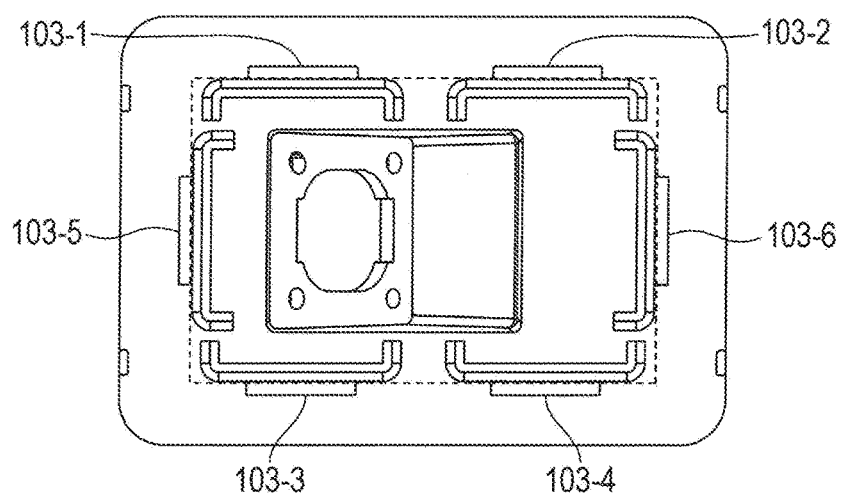
FIG. 8 illustrates a configuration of variation 6 of the bracket main body of the in-vehicle camera bracket according to the embodiment of the present invention (6-point hook)

Variation 6 is a case where, as illustrated in FIG. 8, bracket main body 100 is provided with six planar hooks 103. When in-vehicle camera bracket 10 is attached to vehicle body 30, planar hooks 103-1 and 103-2 are caught by the first internal edge side of attaching hole 31, planar hooks 103-3 and 103-4 are caught by the second side opposite to the first internal edge side of attaching hole 31, planar hook 103-5 is caught by the third internal edge side of attaching hole 31, and planar hook 103-6 is caught by a fourth internal edge side opposite to the third internal edge side of attaching hole 31.

(Effect)

As described above, according to the present invention, three or more planar hooks 103 are disposed such that the hooks are caught at at least opposite two sides of attaching hole 31. With this configuration, the impact or the like in each direction can be dispersed, and the durability of the planar hook can be improved. Further, by employing planar hook 103, vehicle body 30 can be inserted to attaching hole 31 with an insertion locus smaller than that of the conventional techniques.

Further, since cushion 110 is employed in the embodiment of the present invention, entrance of water from bracket main body 100 to vehicle body 30 can be prevented.

It is to be noted that, according to the present invention, an effect similar to that of the case where the in-vehicle camera bracket is attached to the vehicle body can be obtained also when the in-vehicle camera bracket is attached to an attaching resin panel.

This application is entitled to and claims the benefit of Japanese Patent Application No. 2014-231600 filed on Nov.

14, 2014, the disclosure each of which including the specification, drawings and abstract is incorporated herein by reference in its entirety.

INDUSTRIAL APPLICABILITY

The present invention relates to a bracket, and is suitable for an in-vehicle camera bracket for attaching an in-vehicle camera to a vehicle body or an attaching resin panel.

REFERENCE SIGNS LIST

10 In-vehicle camera bracket
20 In-vehicle camera
30 Vehicle body
31 Attaching hole
100 Bracket main body
101 Substrate part
102 Camera fixing part
103 Planar hook
110 Cushion

The invention claimed is:

1. An in-vehicle camera bracket for attaching an in-vehicle camera to a vehicle body, the in-vehicle camera bracket comprising:
 a bracket main body capable of fastening the in-vehicle camera; and
 three or more hooks formed in the bracket main body, and configured to fix the in-vehicle camera to the vehicle body, wherein
 the three or more hooks are disposed such that the three or more hooks are caught by at least two opposite internal edge sides of a nearly rectangular attaching hole provided in the vehicle body when attached to the vehicle body, and
 when the three or more hooks are attached to the vehicle body, a part of at least one of the three or more hooks contacts with each of four internal edge sides of the nearly rectangular attaching hole.

2. The in-vehicle camera bracket according to claim 1, further comprising a cushion for preventing entrance of water at a position between the vehicle body and the bracket main body.

3. The in-vehicle camera bracket according to claim 1, wherein:
 a number of the hooks is three; and
 the three hooks are disposed such that the three hooks are caught by respective internal edge sides of the attaching hole different from one another when attached to the vehicle body.

4. The in-vehicle camera bracket according to claim 1, wherein:
 a number of the hooks is three; and
 two of the hooks are caught by a first internal edge side of the attaching hole, and the remaining hook is caught by a second internal edge side opposite to the first internal edge side of the attaching hole when attached to the vehicle body.

5. The in-vehicle camera bracket according to claim 1, wherein:
 a number of the hooks is four; and
 the four hooks are caught by respective internal edge sides of the attaching hole different from one another when attached to the vehicle body.

6. The in-vehicle camera bracket according to claim 1, wherein:
 a number of the hooks is four; and
 two of the hooks are caught by a first internal edge side of the attaching hole, and the remaining two hooks are caught by a second internal edge side opposite to the first internal edge side of the attaching hole when attached to the vehicle body.

7. The in-vehicle camera bracket according to claim 1, wherein:
 a number of the hooks is five; and
 two of the hooks are caught by a first internal edge side of the attaching hole, other two of the hooks are caught by a second internal edge side opposite to the first internal edge side of the attaching hole, and the remaining hook is caught by a third internal edge side of the attaching hole when attached to the vehicle body.

8. The in-vehicle camera bracket according to claim 1, wherein:
 a number of the hooks is six; and
 two of the hooks are caught by a first internal edge side of the attaching hole, other two hooks are caught by a second internal edge side opposite to the first internal edge side of the attaching hole, another hook is caught by a third internal edge side of the attaching hole, and the remaining hook is caught by a fourth internal edge side opposite to the third internal edge side of the attaching hole when attached to the vehicle body.

* * * * *